United States Patent [19]

Vaudolon

[11] Patent Number: 5,647,598
[45] Date of Patent: Jul. 15, 1997

[54] STUFFING BOX SEAL HAVING BRAIDED PACKINGS AND LIP SEAL RINGS IN COMBINATION WITH A SHAFT SLEEVE

[76] Inventor: Jean-Pierre Vaudolon, Les Bouleries, 72310 La Chapelle Huon, France

[21] Appl. No.: 701,070

[22] Filed: Aug. 21, 1996

Related U.S. Application Data

[63] Continuation of Ser. No. 448,337, Jul. 19, 1995, abandoned.

[51] Int. Cl.$^6$ ......................................................... F16J 15/18
[52] U.S. Cl. ................... 277/59; 277/64; 277/123
[58] Field of Search .......................... 277/58, 59, 64, 277/71, 105, 123, 235 A

[56] References Cited

U.S. PATENT DOCUMENTS

| | | | |
|---|---|---|---|
| 2,443,332 | 6/1948 | Summers | 277/64 |
| 2,864,631 | 12/1958 | Kemp | 277/64 |
| 3,403,915 | 10/1968 | Roberts | 277/59 |
| 3,912,284 | 10/1975 | Gosling et al. | 277/59 |
| 4,969,652 | 11/1990 | Munson | 277/235 A |
| 5,171,022 | 12/1992 | Fessman | 277/64 |
| 5,392,964 | 2/1995 | Stapp et al. | 277/59 |

FOREIGN PATENT DOCUMENTS 990057 9/1951 France ................................. 277/64

*Primary Examiner*—Scott Cummings
*Attorney, Agent, or Firm*—Dennison, Meserole, Pollack & Scheiner

[57] ABSTRACT

A sealing device for a shaft rotating relative to a frame, particularly for a pump shaft, wherein a protective sleeve surrounding the shaft is fixedly mounted for rotation with the shaft; a collar step surrounding the sleeve is fixedly mounted on the frame; a sealing device surrounding the sleeve is non-rotatingly mounted within the frame and includes a lantern ring for connection to a source of lubrication liquid; an annular ring with a sealing lip is inserted between the collar step and lantern ring; and a packing braid is disposed between the lantern ring and a device for compressing the braid.

10 Claims, 2 Drawing Sheets

5,647,598

STUFFING BOX SEAL HAVING BRAIDED PACKINGS AND LIP SEAL RINGS IN COMBINATION WITH A SHAFT SLEEVE

This is a continuation of application Ser. No. 08/448,337 filed on Jul. 19, 1995, now abandoned The invention relates to a sealing device for a rotating shaft.

OBJECTS OF THE INVENTION

The present invention has for its object a sealing device for a rotating shaft, and particularly for a rotating shaft for a pump.

More precisely, the present invention has for its object a sealing device surrounding the rotating shaft which makes it possible effectively to isolate the pump part proper in which the liquid traversing the pump circulates from the mechanical part for rotating and for guiding the shaft of the pump, It will be understood that this is very important, particularly in paper-making industries where the pumps must place liquids in circulation, which liquids may be very corrosive and highly likely to damage the mechanical parts of the pump, and in particular, the bearings thanks to which the shaft is mounted to rotate inside the frame of the pump.

In the known rotating shaft sealing devices, a stuffing box is most often found which is disposed around the shaft inside a packing box, such seal often being completed by an annular recess or lantern ring for introduction of a liquid for lubricating the packings. To make the stuffing box, different types of braids are used, particularly braids of tallowed hemp, Teflon ®-coated braids which may be based on hemp or aramide fiber. Furthermore, in the known systems, the lubrication liquid is most often introduced under pressure and may consist in the injection of the liquid itself which circulates in the pump.

It will also be understood that, when such a pump is used continuously, it is, on the one hand, necessary that the sealing device has a life duration as long as possible in order to reduce the frequency of interventions which increase the duration of non-availability of the pump and that, in particular, the sealing device changing operations may be carried out conveniently without this causing too long a period of non-availability of the pump.

In addition, in order to avoid having to change the shaft itself of the pump, the shaft part disposed opposite the sealing device is covered with a metallic sleeve most often made of bronze or stainless steel. It so happens that these types of sleeves present the drawback of being altered relatively rapid by the effect of friction of the sealing devices which reduces to zero the function of the sleeve.

It is an object of the present invention to provide a sealing device for a rotating shaft, and particularly of a pump, which avoids the drawbacks mentioned hereinabove by increasing the life duration of the sealing device and simplifying the maintenance operations corresponding to the change of the sealing device.

To attain that object, the sealing device for a rotating shaft comprises a frame surrounding the shaft, the sealing device being disposed between the shaft and the frame comprises:

a protective sleeve surrounding the shaft for rotation with the shaft;

a collar step surrounding the sleeve and held fixed in the frame; and a sealing device surrounding the sleeve held fixed in the frame which includes:

a lantern ring with an annular recess held fixed in the frame for connection to a source of lubrication liquid;

at least one annular ring with sealing lip between the collar step and lantern ring, the sealing lip cooperating with an outer face of the sleeve, and at least one packing braid disposed between the lantern ring and the collar step and a means for compressing the braid.

It will be understood that, thanks to the arrangements of the invention, the seal between the collar step and the lubrication recess is ensured by the lipped sealing rings which makes it possible, on the one hand, to improve the seal, particularly between the pump and the lubrication liquid and, on the other hand, to simplify the maintenance operations since these lipped rings present a very long life. Further, the rings are disposed in the zone where the packing braids of the prior art solutions were in fact inaccessible due to the presence of the lantern ring comprising the recess for injection of lubrication liquid.

According to a preferred embodiment of the invention, the protective sleeve is made of steel and is coated with a protective layer comprising 50 to 70% of the addition metal and 30 to 50% of binding agent. Percentages of weight as is conventional in the art.

Such a composition of the protection layer ensures a high mechanical strength of the outer face of the sleeve while presenting a considerable ease of employment.

Other characteristics and advantages of the present invention will appear more readily on reading the following description of an embodiment of the invention given by way of non-limiting example.

DETAILED DESCRIPTION OF THE INVENTION

Figure 1:
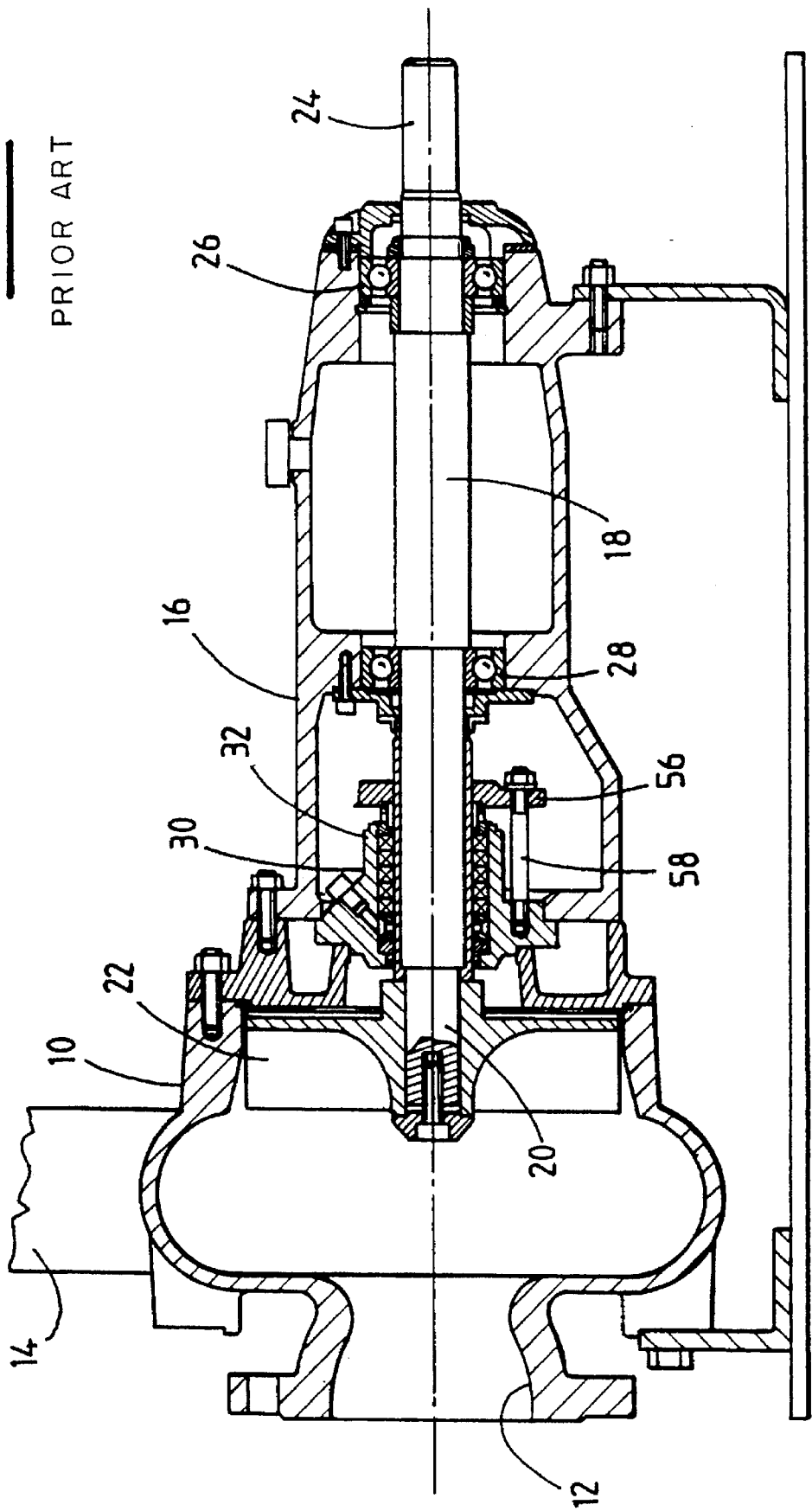
FIG. 1 is a view in longitudinal section of a pump of conventional type.

Referring first to FIG. 1, the general structure of a pump on which the sealing device for a rotating shaft may be mounted will be described. This pump comprises a shell or housing 10 with its inlet conduit 12 and its outlet conduit 14. The shell 10 is extended by a pump body or frame 16 in which the rotating shaft 18 is mounted. On the first end 20 of the shaft, the rotor 22 of the pump is mounted, which rotor is, of course, disposed inside the shell 10. The second end 24 of the shaft is connected to a motor (not shown in the Figure). The shaft 18 is supported for rotation by two bearings 26 and 28 in known manner with suitable ball bearing assemblies. In this way, the rotor 20 is in overhang position with respect to the bearings 26 and 28. It will be understood that it is necessary to produce a seal between the interior of the shell 10 in which the fluid circulates and the mechanical part for supporting the shaft 18 for rotation, this mechanical part being essentially constitutes by the bearing assemblies 26 and 28.

FIG. 1 schematically shows the sealing device 30 disposed between the shell 10 and the first bearing 28. This figure shows the sealing device only schematically. However, it will be understood that the sealing device essentially comprises a stuffing box 32 which is fixed to the pump body 16 and which surrounds the shaft 18 and serves to hold the sealing device 30.

Figure 2:
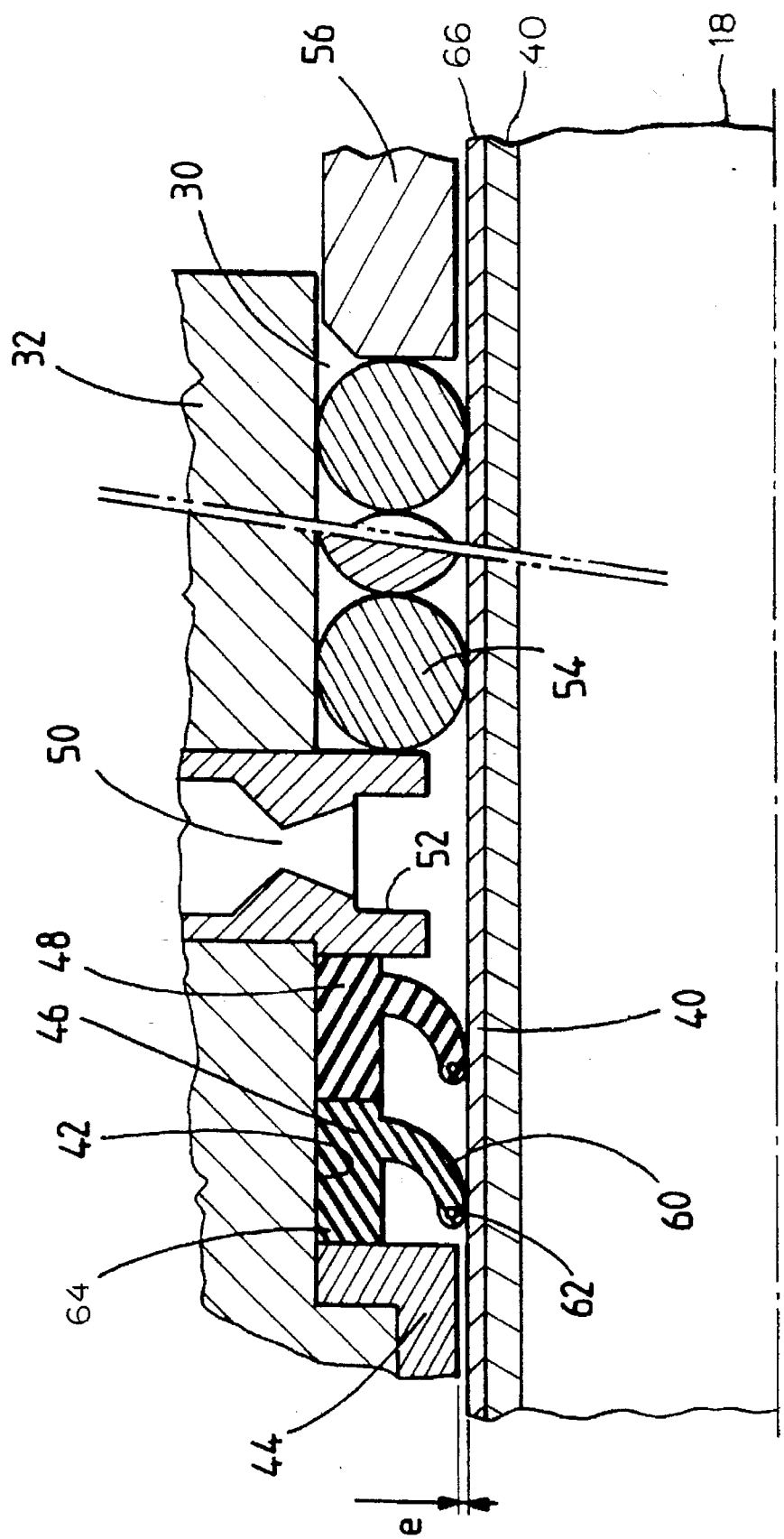
FIG. 2 is a longitudinal half-section of the sealing device according to the invention.

Referring now to FIG. 2, the sealing device 30 mounted inside the stuffing box 32 will be described in greater detail. As this figure shows, the shaft 18 is covered with a protective sleeve 40 which extends at least over the part of the shaft opposite the sealing device. The embodiment of the sleeve 40 will be described hereinafter in greater detail.

The protective sleeve 40 is slidingly fitted onto the outer face of the shaft 18.

As is well known, the stuffing box 32 comprises an inner countersink opening 42. Engaged around the shaft 18 are the different elements constituting the sealing device 30. Shown along the shaft 18 from its motor end 24 is a first bearing 26, a second bearing 28, and between the bearing 28 and rotor 22 shaft end 20, there are inside a countersink opening 42 a collar step 44, two elastomer annular sealing rings 46 and 48, a lantern ring 50 including an annular recess 52 for the introduction of a lubricating liquid for the sealing device, and a plurality of packing braids 54, these components being maintained compressed in the countersink opening 42 by a rammer 56. As shown better in FIG. 1, the rammer 56 is maintained in place and tightened by screws, such as 58.

The collar step 44 is of conventional type. It is made of bronze or of celoron and essentially constitutes an interchangeable wear piece. It thus makes it possible to avoid, particularly in the case of vibrations, wear of the shaft or of the stuffing box 32. The clearance e between the outer face of the sleeve 40 and the inner face of the collar step 44 is preferably very small, for example, of the order of 0.2 mm, in order to reduce the specific pressure of the liquid on the sealing device.

The elastomer annular sealing rings 46 and 48 are disposed between the lubricating lantern 52 and the collar step 44. These two sealing rings are of the lipped type and comprise a fixation body 64 in contact with the wall of the countersink opening 42 and a deformable lip 60. Each lip 60 is incurved in the direction of the collar step 44 in order that, under the effect of the pressure, the lip 60 tends to be pressed against the shaft 18. The nature of the elastomer employed to produce the rings 46 and 48 depends on the fluids conveyed by the pump or on the lubricating liquid. It is also possible to provide rings 46 and 48 in which an annular spring 62 is embedded in the lip 60 to increase the contact pressure between the lip and the outer face of the shaft. The sealing rings may preferably be made of the material marked under the Trademark VITON®.

The lantern ring 50 may be of conventional type. It defines an annular recess for supplying lubricating liquid, comprises an inlet orifice 50 which can be connected to a source of lubricating liquid, and it presents preferably an inlet orifice 50 opposite an orifice for outlet of the lubricating liquid (not shown in FIG. 2). This outlet orifice makes it possible to avoid any risk of overpressure of the lubricating liquid in this zone and, therefore, any risk of passage of the lubricating liquid towards the shell of the pump.

Beyond the lantern ring 50, a plurality of packing braids 54 are inserted. The number of braids depends on the seal which it is desired to produce. The packing braids are preferably based on Teflon®-coated aramide fibers.

It will be understood that this arrangement ensures a very effective seal between the pump proper and the mechanical members for guiding the shaft while allowing easy maintenance of the pump. In fact, it will be understood that the packing braids 54, after dismantling of the rammer 56, may be easily extracted from the stuffing box by any suitable means since access is free. On the other hand, concerning the sealing components disposed beyond the lantern ring 52 and which are therefore not accessible except during considerable dismantlings, the question is not raised since the lipped rings 46 and 48 have a very high mechanical resistance and do not require frequent replacement. It should be added that the chosen braids 54 also present a very high life expectancy, typically at least of the order of 12 months.

The quality of the seal avoids the passage of the liquid pumped towards the mechanical part of the pump. This presents two principal advantages. On the one hand, the mechanical part is protected from corrosion due to the liquid circulating in the pump. On the other hand, losses of liquid are avoided which may be very important when the liquid has a high value.

As indicated, the protective sleeve 40 is preferably constituted from a steel sleeve which is not stainless, but which may possibly be in certain cases, where a protective coating 66 of added metal is made. According to the invention, this protective coating has a thickness of about 1 mm. To produce the protecting layer of the sleeve, a mixture of 60% addition metal, more generally in a range between 50 and 70%, and of 40% of binding agent, more generally in a range from 30 to 50% weight is used. The binding agent allows a re-melting to allow the deposit and fixation of the added metal at a temperature of the order of 1200° C. In known manner, the added material may be chromium carbide, tungsten carbide, or similar materials.

I claim:

1. A sealing device for a shaft rotating relative to a frame surrounding the shaft, said sealing device being disposed between the shaft and the frame, said sealing device, comprising:

a protective sleeve surrounding said shaft and fixedly mounted for rotation with the shaft;

a collar step surrounding said sleeve and fixedly mounted on said frame;

sealing means surrounding said sleeve and non-rotatingly mounted within the frame; said sealing means including:

a lantern ring with an annular recess fixedly mounted to the frame for connection to a source of lubrication liquid;

at least one annular ring having a fixation body and a deformable sealing lip for cooperating with an outer face of said sleeve;

said at least one annular ring being disposed between said collar step and said lantern ring;

at least one packing braid; and means for compressing said at least one packing braid, said at least one packing braid being disposed between said lantern ring and said means for compressing.

2. The sealing device according to claim 8, wherein said protective sleeve includes a coating layer which has a thickness of the order of 1 mm.

3. The sealing device according to claim 8 wherein the sealing lip of said at least one annular ring is incurved towards the collar step.

4. The sealing device according to claim 9 wherein said annular rings are made of an elastomer material.

5. The sealing device according to claim 8 wherein said at least one packing braid is made of Teflon®-coated aramide fiber.

6. A sealing device for a shaft rotating relative to a frame surrounding the shaft, the sealing device being disposed between the shaft and the frame, said sealing device comprising:

a protective sleeve surrounding said shaft and fixedly mounted for rotation with said shaft;

a collar step surrounding said protective sleeve and fixedly mounted on the frame;

sealing means surrounding the sleeve and non-rotatingly mounted within the frame; said sealing means including:

a lantern ring with an annular recess fixedly mounted to the frame for connection to a source of lubrication liquid;

two annular rings, each having a fixation body and a deformable sealing lip for cooperating with an outer surface of said protective sleeve, said annular rings being disposed between said collar step and said lantern ring;

a plurality of packing braids; and means for compressing said packing braids, said packing braids being disposed between said lantern ring and said means for compressing.

7. The sealing device according to claim 6, wherein the sealing lips of the annular rings are incurved towards said collar step.

8. A sealing device for a shaft rotating relative to a frame surrounding the shaft, the sealing device being disposed between the shaft and the frame, said sealing device, comprising:

a protective sleeve surrounding said shaft and fixedly mounted for rotation with the shaft;

a collar step surrounding the sleeve and fixedly mounted on the frame;

sealing means surrounding the sleeve and non-rotatingly mounted within the frame; said sealing means including:

a lantern ring with an annular recess fixedly mounted to the frame for connection to a source of lubrication liquid;

at least one annular ring with sealing lip between the collar step and the lantern ring, said lip pressing against an outer face of the sleeve;

at least one packing braid disposed between the lantern ring and the collar step, and means for compressing said braid; wherein said protective sleeve is made of steel and is coated with a protective layer comprising 50 to 70% by weight of addition metal and 30 to 50% by weight of binding agent.

9. A sealing device for a shaft rotating relative to a frame surrounding the shaft, the sealing device being disposed between the shaft and the frame, said sealing device comprising:

a protective sleeve surrounding said shaft and fixedly mounted for rotation with the shaft;

a collar step surrounding the sleeve and fixedly mounted on the frame;

sealing means surrounding the sleeve and nonrotatingly mounted within the frame; said sealing means including:

a lantern ring with an annular recess fixedly mounted to the frame for connection to a source of lubrication liquid;

two annular rings, each with a sealing lip, disposed between the collar step and the lantern ring, each sealing lip pressing against an outer face of the sleeve, a plurality of packing braids disposed between said lantern ring and said collar step; and means for compressing said braids, wherein said protective sleeve is made of steel and is coated with a protective layer comprising 50 to 70% by weight of addition metal and 30 to 50% by weight of binding agent.

10. The sealing device according to claim 9, wherein the sealing lips of the annular rings are incurved towards the collar step.

* * * * *